(12) United States Patent
Forte et al.

(10) Patent No.: US 9,773,068 B2
(45) Date of Patent: *Sep. 26, 2017

(54) METHOD AND APPARATUS FOR DERIVING AND USING TRUSTFUL APPLICATION METADATA

(71) Applicant: AT&T Intellectual Property I, L.P., Atlanta, GA (US)

(72) Inventors: Andrea G. Forte, Brooklyn, NY (US); Baris Coskun, Weehawken, NJ (US); Qi Shen, New York, NY (US); Ilona Murynets, Rutherford, NJ (US); Jeffrey Bickford, Somerset, NJ (US); Mikhail Istomin, Brooklyn, NY (US); Paul Giura, Cairo, NY (US); Roger Piqueras Jover, New York, NY (US); Ramesh Subbaraman, Jersey City, NJ (US); Suhas Mathur, Bayonne, NJ (US); Wei Wang, Hoboken, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/269,096

(22) Filed: Sep. 19, 2016

(65) Prior Publication Data
US 2017/0004217 A1    Jan. 5, 2017

Related U.S. Application Data

(63) Continuation of application No. 13/540,104, filed on Jul. 2, 2012, now Pat. No. 9,449,104.

(51) Int. Cl.
| | | |
|---|---|---|
| *G06F 7/00* | (2006.01) | |
| *G06F 17/30* | (2006.01) | |
| *G06Q 10/00* | (2012.01) | |

(52) U.S. Cl.
CPC .. *G06F 17/30867* (2013.01); *G06F 17/30554* (2013.01); *G06Q 10/00* (2013.01)

(58) Field of Classification Search
CPC ........ G06F 17/30867; G06F 17/30554; G06Q 10/00; G06C 30/0185
USPC .......................... 707/709, 748, 749, 758, 767
See application file for complete search history.

(56) References Cited

U.S. PATENT DOCUMENTS

| | | |
|---|---|---|
| 8,321,949 B1 | 11/2012 | Green et al. |
| 2004/0192440 A1* | 9/2004 | Evans ..................... A63F 13/12 463/30 |
| 2012/0210431 A1 | 8/2012 | Stahlberg |
| 2012/0240236 A1 | 9/2012 | Wyatt et al. |
| 2013/0283377 A1 | 10/2013 | Das et al. |

* cited by examiner

*Primary Examiner* — Md. I Uddin (57) ABSTRACT

A method, non-transitory computer readable medium and apparatus for deriving trustful metadata for an application are disclosed. For example, the method crawls online for the application, analyzes the application to determine a function of the application, and generates trustful meta-data for the application based upon the function of the application.

20 Claims, 5 Drawing Sheets

METHOD AND APPARATUS FOR DERIVING AND USING TRUSTFUL APPLICATION METADATA

This application is a continuation of U.S. patent application Ser. No. 13/540,104, filed Jul. 2, 2012, now U.S. Pat. No. 9,449,104, which is herein incorporated by reference in its entirety.

The present disclosure relates generally to metadata for software applications and, more particularly, to a method and apparatus for deriving and using trustful application metadata.

BACKGROUND

Mobile endpoint device use has increased in popularity in the past few years. Associated with the mobile endpoint devices are the proliferation of software applications broadly known as "apps" or "applications") that are created for the mobile endpoint device.

The number of available apps is growing at an alarming rate. Currently, hundreds of thousands of apps are available to users via app stores such as Apple's® app store and Google's® Android marketplace. However, with the enormous growth of apps available in the Internet, there has been little control over metadata associated with the apps. For example, malicious apps may be disguised as popular apps by providing false information in the metadata. As a result, when users see a particular app, they may believe it to be a legitimate app or a popular app and download and install the malicious app instead.

SUMMARY

In one embodiment, the present disclosure provides a method for deriving trustful metadata for an application. For example, the method crawls online for the application, analyzes the application to determine a function of the application, and generates trustful meta-data for the application based upon the function of the application.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, non-transitory computer readable medium and apparatus for deriving trustful metadata for software applications ("apps"). The growing popularity of apps for mobile endpoint devices has lead to an explosion of the number of apps that are available. Currently, there are hundreds of thousands of apps available for mobile endpoint devices.

However, there has been little standardization or control as to how and what information may be inserted into a meta-data file that describes a particular app. Currently, developers may create a meta-data file for an app with whatever information they desire. In addition, third parties may also be able to modify the meta-data file.

As a result, the meta-data may be manipulated by various parties to include information that may not accurately describe the app it is associated with. Some developers may take advantage of the ability to manipulate meta-data and attempt to insert information in the meta-data associated with a popular app. Consequently, when the popular app is searched for by users, their apps will also appear in a search result presented to the user. For example, some developers may insert the term "Angry Birds®" into the meta-data file of a productivity app such that when a user searches for the "Angry Birds®" app, the productivity app will also appear, even though the productivity app is completely unrelated to the "Angry Birds®" app.

Worse yet, some hackers may attempt to infect endpoint devices with harmful viruses or Trojan horse apps using the same technique. For example, the meta-data may be created to make the virus app appearing as a copy of a popular app. As a result, a user may not know that he or she is actually downloading and executing a virus app instead of the app the user was actually looking for. Thus, there is a need to provide users with trustful meta-data that can be trusted by users.

Figure 1:
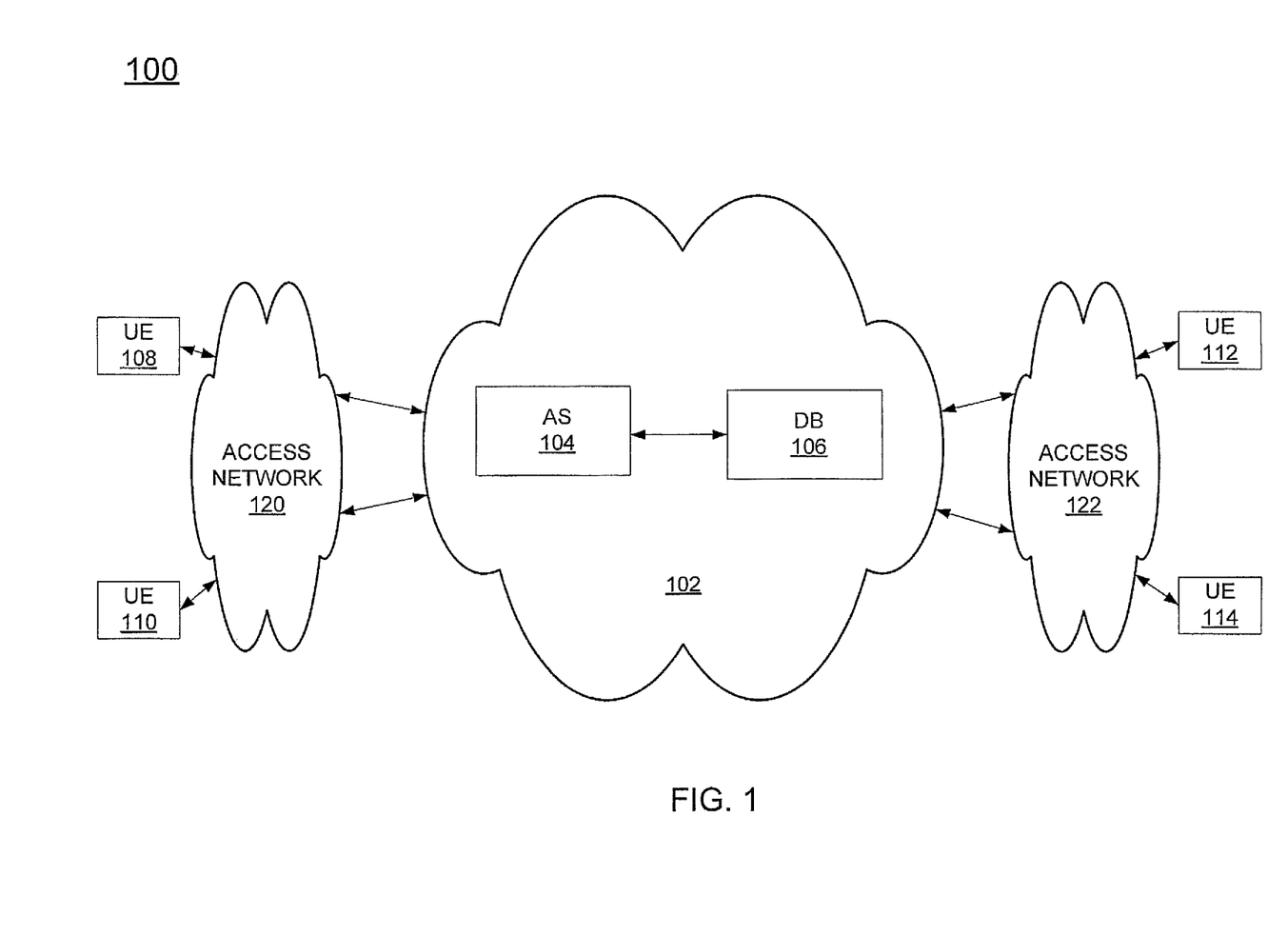
FIG. 1 illustrates one example of a communications network of the present disclosure.

FIG. 1 is a block diagram depicting one example of a communications network 100. The communications network 100 may be any type of communications network, such as for example, a traditional circuit switched network (e.g., a public switched telephone network (PSTN)) or a packet network such as an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like. It should be noted that the present disclosure is not limited by the underlying network that is used to support the various embodiments of the present disclosure.

In one embodiment, the network 100 may comprise a core network 102. The core network 102 may be in communication with one or more access networks 120 and 122. The access networks 120 and 122 may include a wireless access network (e.g., a WiFi network and the like), a cellular access network, a PSTN access network, a cable access network, a wired access network and the like. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one embodiment, the core network 102 may include an application server (AS) 104 and a database (DB) 106. Although only a single AS 104 and a single DB 106 are illustrated, it should be noted that any number of application servers 104 or databases 106 may be deployed.

Figure 5:
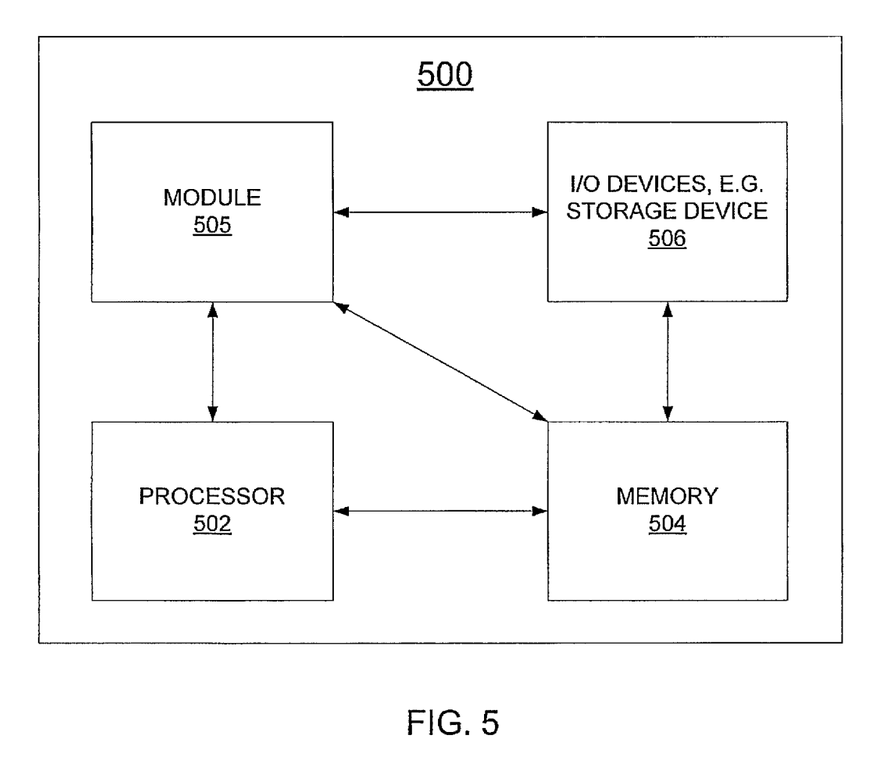
FIG. 5 illustrates a high-level block diagram of a general-purpose computer suitable for use in performing the functions described herein.

In one embodiment, the AS 104 may comprise a general purpose computer as illustrated in FIG. 5 and discussed below. In one embodiment, the AS 104 may perform the methods and algorithms discussed below related to deriving trustful meta-data.

In one embodiment, the DB 106 may store various meta-data for each one of a plurality of apps collected by a web crawler. In addition, the DB 106 may store the generated trustful meta-data. The generation of the trustful meta-data is discussed in further detail below.

In one embodiment, the DB 106 may store various information gathered by analyzing the apps. The information gathered by analyzing the apps may be used to generate the trustful meta-data. The various information may include, for example, call graphs, information about application programming interface (API) usage, information about local behavior (e.g., does the app access personal information stored on the endpoint device, and the like) and usage of an app (e.g., computer processing capacity used, memory used, battery life used, local endpoint device sensors used, such as a global position system (GPS), and the like), information about network behavior and usage of an app (e.g., network bandwidth used, which network protocols are used, such as real-time transport protocol (RTP), session initiation protocol (SIP)), and the like.

In one embodiment, the DB 106 may also store a plurality of apps that may be accessed by users via their endpoint device. In one embodiment, a plurality of databases 106 storing a plurality of apps may be deployed. In one embodiment, the databases may be co-located or located remotely from one another throughout the communications network 100. In one embodiment, the plurality of databases may be operated by different vendors or service providers. Although only a single AS 104 and a single DB 106 are illustrated in FIG. 1, it should be noted that any number of application servers or databases may be deployed.

In one embodiment, the access network 120 may be in communication with one or more user endpoint devices (also referred to as "endpoint devices" or "UE") 108 and 110. In one embodiment, the access network 122 may be in communication with one or more user endpoint devices 112 and 114.

In one embodiment, the user endpoint devices 108, 110, 112 and 114 may be any type of endpoint device such as a desktop computer or a mobile endpoint device such as a cellular telephone, a smart phone, a tablet computer, a laptop computer, a netbook, an ultrabook, a tablet computer, a portable media device (e.g., an iPod® touch or MP3 player), and the like. It should be noted that although only four user endpoint devices are illustrated in FIG. 1, any number of user endpoint devices may be deployed.

It should be noted that the network 100 has been simplified. For example, the network 100 may include other network elements (not shown) such as border elements, routers, switches, policy servers, security devices, a content distribution network (CDN) and the like.

Figure 2:
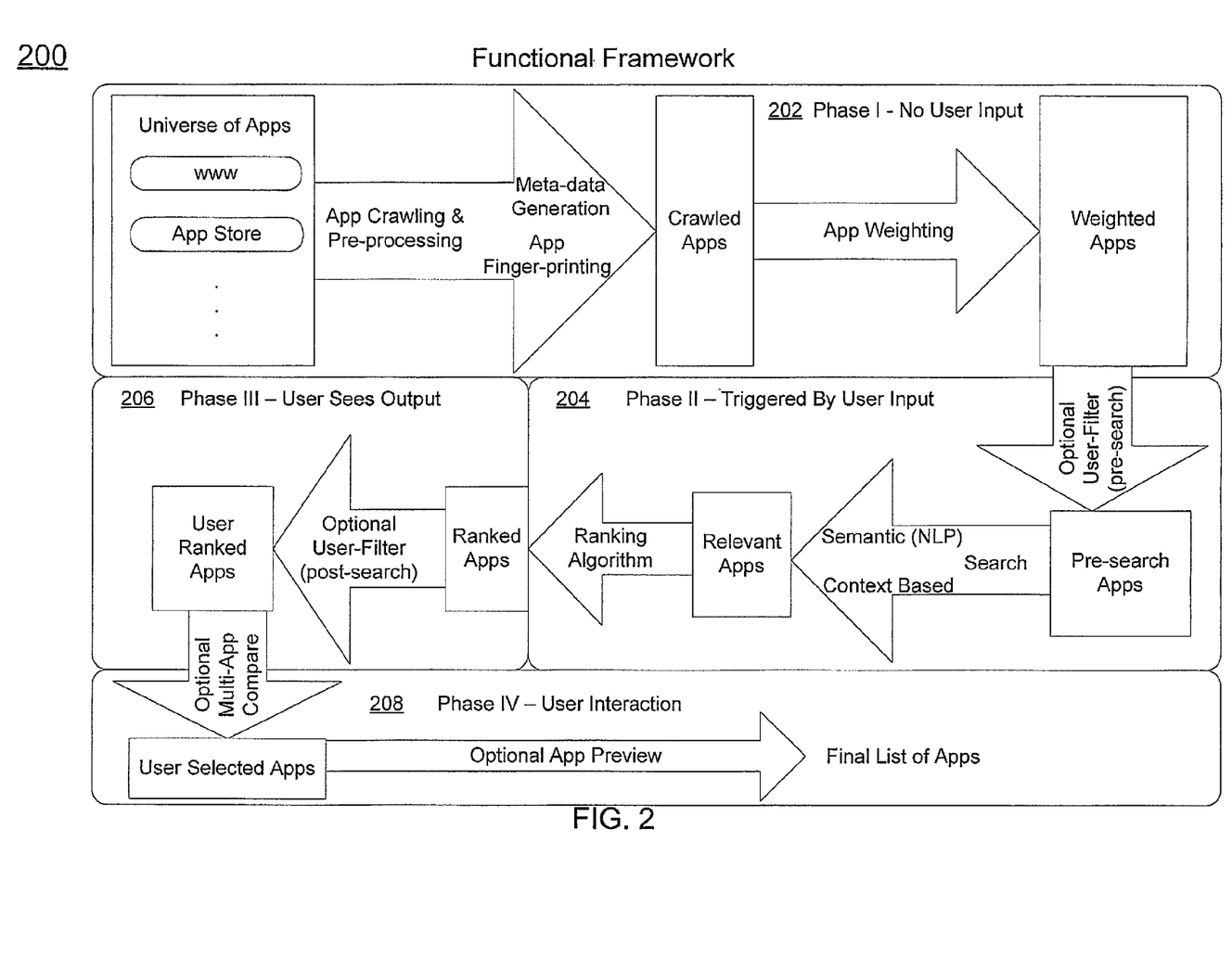
FIG. 2 illustrates an example functional framework flow diagram for app searching.

FIG. 2 illustrates an example of a functional framework flow diagram 200 for app searching. In one embodiment, the functional framework flow diagram 200 may be executed for example, in a communication network described in FIG. 1 above.

In one embodiment, the functional framework flow diagram 200 includes four different phases, phase 1202, phase II 204, phase III 206 and phase IV 208. In phase 1202, operations are performed without user input. For example, from a universe of apps, phase I 202 may pre-process each one of the apps to obtain and/or generate meta-data and perform app fingerprinting to generate a "crawled app." Apps may be located in a variety of online locations, for example, an app store, an online retailer, an app marketplace or individual app developers who provide their apps via the Internet, e.g., websites. An online location is broadly interpreted as a location accessible via a network connection. Thus, crawling "online" for an app is broadly interpreted as accessing an app via a network connection, e.g., accessing an app on a local area network (or server) or through the Internet where the app is located on an external network (or server).

In one embodiment, a web crawler may be used to obtain various apps and the associated meta-data for each one of the apps. However, as noted above, the meta-data generated by the developer that is obtained from the Internet or the world wide web may not be trusted due to the ease of manipulating the meta-data.

As a result, in phase 1202, a third party or a network service provider may generate trustful meta-data that may be relied on by an end user or subscriber of the service provider. In other words, the network service provider may vet the meta-data for the subscribers to ensure that the meta-data accurately describes the app. By generating the trustful meta-data, the subscriber may have faith that the meta-data accurately describes the app.

In addition, the trustful meta-data may be leveraged to provide additional configurable search parameters for the user. For example, the trustful meta-data may include information about various attributes associated with the app that were obtained by analyzing the app to generate the trustful meta-data. These attributes may be used by a subscriber or end user to further narrow search queries for apps, such as searching based upon memory usage, bandwidth usage, what files the app attempts to access during use, and the like.

In one embodiment, the apps may also be fingerprinted to eliminate harmful apps, such as viruses, and common apps can also be grouped together that may be appear to be different apps based upon the meta-data. Once the trustful meta-data is generated and the apps are fingerprinted, the apps may be weighted to assign an initial weighting that is used to compute an initial ranking.

For example, at phase 1202, the method may optionally apply a weight to each application to generate a "weighted app." For example, the weight can be applied in accordance with various parameters, e.g., a reputation of the app developer, a cost of app, the quality of the technical support provided by the developer, a size of the app (e.g., memory size requirement), ease of use of the app in general, ease of use based on the user interface, effectiveness of the app for its intended purpose, and so on. For example, a reputation of a developer for developing particular types of apps may optionally also be obtained, e.g., from a public online forum, from a social network website, from an independent evaluator, and so on. The reputation information implemented via weights may then be used to calculate an initial ranking for each one of the apps, e.g., a weight of greater than 1 can be applied to a developer with a good reputation, whereas a weight of less than 1 can be applied to a developer with a poor reputation. It should be noted that the weights (e.g., with a range of 1-10, with a range between 0-1, and so on) can be changed based on the requirements of a particular implementation.

An optional user based filtering step can be applied once the apps are weighted and an initial ranking for each of the apps is computed. For example, each user may have a predefined set of parameters that are to be applied to all of the apps, e.g., excluding all apps of a particular size due to hardware limitation, excluding all apps based on a cost of the apps, excluding all apps from a particular developer and so on. It should be noted that this step is only applied if the user has a predefined set of filter criteria to be applied to generate "pre-search apps".

Alternatively, once the apps are weighted and an initial ranking for each of the apps is computed, phase II 204 is triggered by user input. For example, during phase II 204 a user may input a search query for a particular app. In one embodiment, the search may be based upon a natural language processing (NLP) or semantic query. For example, the search may simply be a search based upon matches of keywords provided by the user in the search query. Using the NLP query, a NLP ranking of the app may be computed.

In one embodiment, the search may be based upon a context based query. For example, the search may be performed based upon what (e.g., an activity the user is participating in), where (e.g., a location), when (e.g., a time of day) and with whom (e.g., a single user, a group of users, friends, family, an age of the user and the like) a user is performing an activity.

A ranking algorithm may be applied to the apps that accounts for at least the initial ranking and the context based ranking to compute a final ranking of the apps. In one embodiment, the final ranking may be calculated based upon the initial ranking, the context based ranking, the NLP ranking and/or a user feedback ranking. For example, the weight values of each of the rankings may be added together to compute a total weight value, which may then be compared to the total weight values of the other apps.

At phase III 206, the results of the final ranking are presented to the user. As discussed above, the trustful meta-data that is generated may be used to allow a user to further filter apps or narrow the search based upon particular attributes of the apps. For example, the user may want to further narrow down the search to apps that use less than 100 megabytes of memory space or narrow down the search to apps to eliminate any apps that access personal contact information during operation, and the like.

At phase IV 208, the user may select one of the apps and interact with the app. For example, the user may select one of the apps and either preview the app or download the app for installation and execution on the user's endpoint device.

Figure 3:
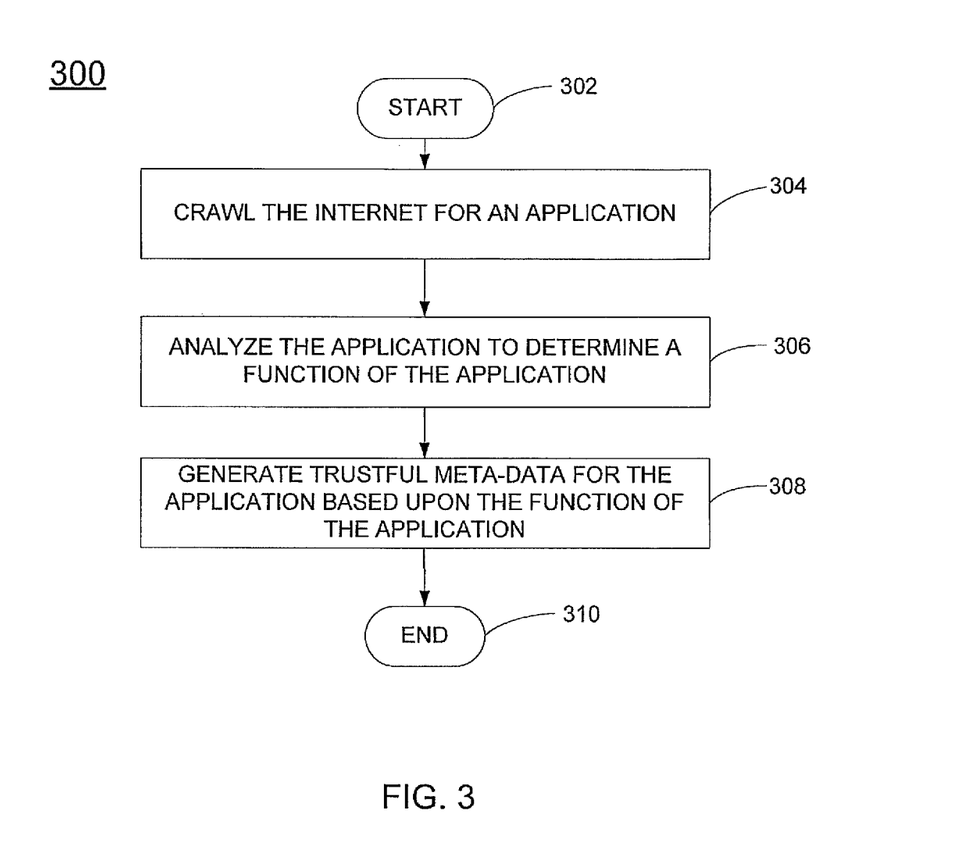
FIG. 3 illustrates an example flowchart of one embodiment of a method for deriving trustful meta-data for an app.

FIG. 3 illustrates a flowchart of a method 300 for deriving trustful metadata for an app. In one embodiment, the method 300 may be performed by the AS 104 or a general purpose computing device as illustrated in FIG. 5 and discussed below.

The method 300 begins at step 302. At step 304, the method 300 crawls the Internet for meta-data of an app. For example, the web crawler may be deployed by the AS 104 to crawl the Internet (e.g., websites or online stores that have apps for purchase and download) for one or more apps and the associated meta-data. For example, in one embodiment, there may already be meta-data associated with the app. However, as noted above, the meta-data may not be trusted as meta-data may be easily manipulated by a developer or another third party.

At step 306, the method 300 analyzes the app to determine how the app functions. By analyzing the app to see how the app functions, information may be gathered to generate trustful meta-data that accurately reflects the true identity and functions of the app. In other words, a third party or a network service provider may actually analyze the app to reveal the true functionality of the app rather than blindly relying on the meta-data that is provided or that pre-existed with the app.

The app may be analyzed using a variety of methods and by a variety of parties. For example, the app may be analyzed by a developer, by an operator preview, by a user preview, and the like. The analysis may include static analysis, dynamic analysis and analysis of various files associated with an app.

The analysis may attempt to collect information regarding how the app functions and the attributes of an app. For example, the attributes may include how the app behaves with respect to accessing personal information stored on a local endpoint device, how much processing capacity the app uses, how much memory the app uses, how much battery life the app consumes (i.e., rate of power consumption), which sensors of the endpoint device are used by the app (e.g., a GPS sensor, an accelerometer, a camera, a microphone, etc.), how much network bandwidth the app uses, which network protocols are used by the app, and the like.

Figure 4:
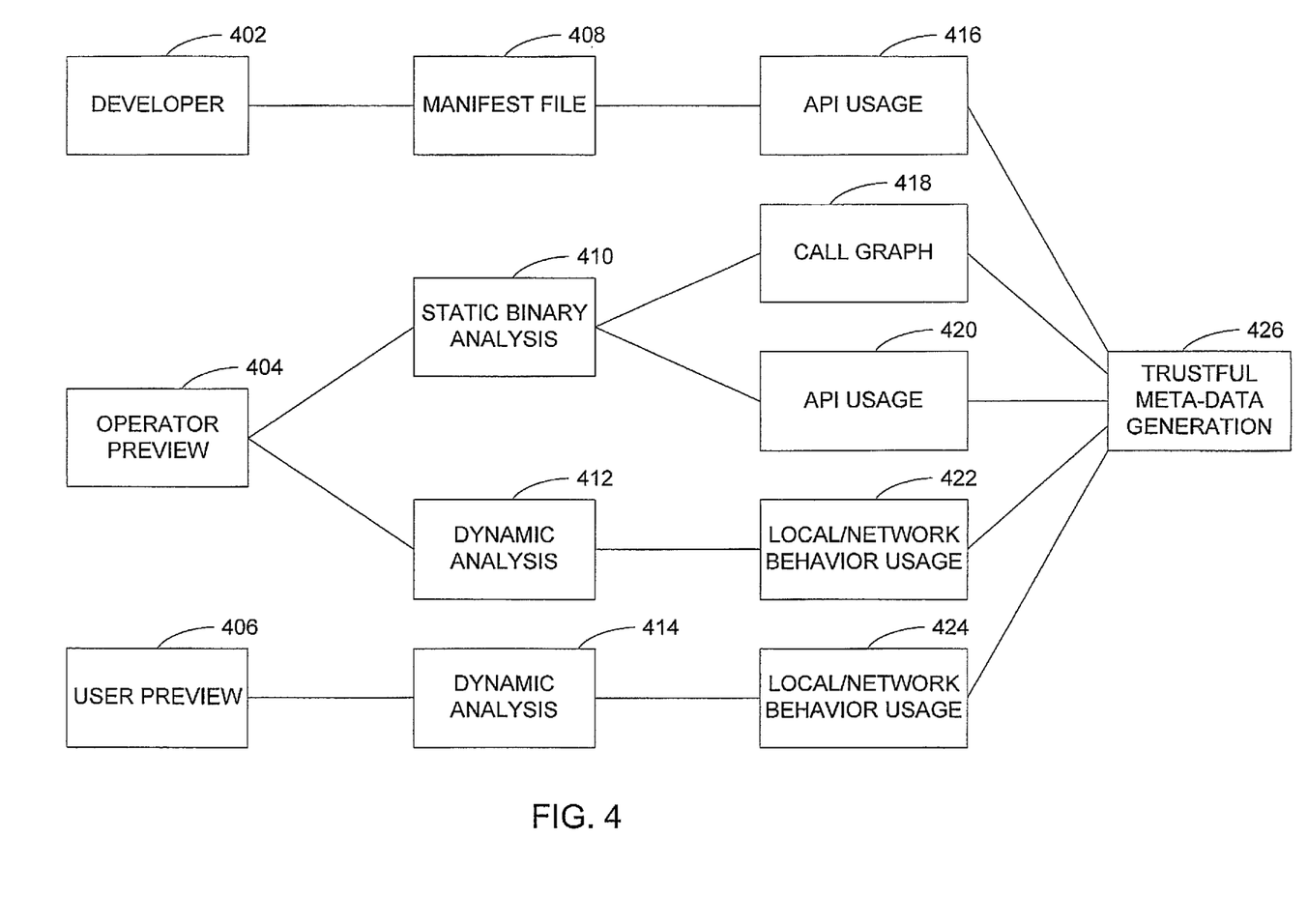
FIG. 4 illustrates an example block diagram of one embodiment of analyzing meta-data of the app.

FIG. 4 illustrates an example block diagram 400 of the various types of analysis that may be performed to generate trustful metadata. For example, the analysis may be performed by one or more different parties that perform various types of analysis.

For example, in one embodiment, the analysis may be performed by a developer 402, an operator preview 404 or by a user preview 406. In one embodiment, the developer 402 may gather information about the app using certain files 408, e.g., a manifest file for Android® operating systems. The files may be analyzed to obtain application programming interface (API) usage information 416.

In one embodiment, the operator preview 404 may analyze the app by performing a static binary analysis 410 or a dynamic analysis 412. For example, the operator preview 404 may be performed by a network service provider or another third party tasked with performing the analysis.

In one embodiment, the static binary analysis 410 may analyze certain code of the app that does not change, for example, call graphs 418 or API usage 420. Looking at the call graphs 418 or the API usage 420 may help gather information about what programs the app is actually executing and how the app is executing them.

In one embodiment, the dynamic analysis 412 may analyze local and network behavior and usage 422. For example, dynamic analysis 412 may include analysis of how the app functions during operation, e.g., how the app responds to user inputs, and the like.

In one embodiment, local behavior may include information such as, for example, whether the app accesses personal information stored on the endpoint device, whether the app attempts to access or execute other applications on the endpoint device, whether the app stores cookies on the endpoint device, and the like. In one embodiment, the local usage may include information such as, for example, how much processing power of the endpoint device the app uses, how much memory of the endpoint device the app uses, how much battery life of the endpoint device the app uses, which sensors on the endpoint device the app uses, and the like. In one embodiment, network behavior may include information such as, for example, what network protocols are used by the app, does the app scan for particular ports, how often does the app communicate through the network while running, and the like. In one embodiment, the network usage may include information such as, for example, how much bandwidth the app uses in the network, how much processing resources the app uses in the network, how much data the app is storing in the network, and the like.

In one embodiment, the user preview 406 may analyze the app by performing a dynamic analysis 414. In one embodiment, the user preview 406 may be a live preview application on the user's endpoint device that can be monitored by the network, e.g., by the AS 104, to collect information.

For example, a user may want to "test drive" an app before purchasing and downloading the app. The live preview allows the user to execute and operate the app on the user's endpoint device, or remotely from a server, as if the user had purchased the app. As a result, the service provider may allow the user to preview the app before purchasing and downloading. During the course of the user preview, the service provider or network may collect information about how the app behaves or is used while the user is "test driving" the app.

In one embodiment, the dynamic analysis 414 may analyze local and network behavior and usage 424 similar to the dynamic analysis 412 of the operator preview 404. In one embodiment, local behavior may include information such as, for example, does the app access personal information stored on the endpoint device, does the app attempt to access or execute other applications on the endpoint device, does the app store cookies on the endpoint device, and the like. In one embodiment, the local usage may include information such as, for example, how much processing power of the endpoint device the app uses, how much memory of the endpoint device the app uses, how much battery life of the endpoint device the app uses, which sensors on the endpoint device the app uses, and the like. In one embodiment, network behavior may include information such as, for example, what network protocols are used by the app, does the app scan for particular ports, how often does the app communicate through the network while running, and the like. In one embodiment, the network usage may include information such as, for example, how much bandwidth the app uses in the network, how much processing resources the app uses in the network, how much data the app is storing in the network, and the like.

In one embodiment, the information gathered from all of the analysis may be used to generate the trustful meta-data. For example, by analyzing the app and testing to see how the app truly operates, the app may be vetted and the trustful meta-data may be generated that can be trusted, unlike the meta-data that is currently available for an app. In other words, an objective third party, such as for example, a network service provider, may generate trustful meta-data that is based upon actual analysis and testing of the app. In other words, the trustful meta-data is generated by a different party than the party that generated the original meta-data associated with an app.

In one embodiment, one or more of the analysis performed by the developer 402, the operator preview 404 or the user preview 406 may be used to generate the trustful meta-data. In other words, not all of the analysis may be needed to generate the trustful meta-data. For example, the trustful meta-data may be generated with only the developer 402 analysis or the developer 402 analysis and the operator preview 404 analysis and so on. In addition, any one of the analysis methods may be executed by any of the developer 402, the operator preview 404 or the user preview 406. For example, the developer 402 may also use static binary analysis and/or dynamic analysis.

Referring back to FIG. 3, at step 308 the method 300 generates trustful meta-data for the app based upon how the app functions. It should be noted that the trustful meta-data may be considered to be an additional meta-data file for the app. The generation of the trustful meta-data is not simply a modification of one or more fields in an existing meta-data file. Rather, it creates a second different meta-data file associated with the app based upon how the app functions. Thus, the existing meta-data file can be retained and is not deleted or over-written in one embodiment.

In other words, the apps that are obtained in step 304 may already be associated with pre-existing meta-data. However, by generating the "trustful" meta-data, a network service provider may provide the trustful meta-data file to an end user or subscriber instead of the pre-existing meta-data that was obtained with the app.

The trustful meta-data may be presented to a subscriber or an end user such that the subscriber or the end user may have full confidence that the trustful meta-data accurately describes the app. As a result, the additional service provided by the service provider may be provided as a subscription service (e.g., a service provided for an additional fee or as an added feature to a data plan service, e.g., Internet access service) to the end user or subscriber by ensuring that apps having trustful meta-data are not malicious virus apps or Trojan horse apps.

In addition, the trustful meta-data may be leveraged to provide additional configurable search parameters for the user. For example, the trustful meta-data may include information about various attributes associated with the app that were obtained when the app was analyzed to generate the trustful meta-data. These attributes may be used by a subscriber or end user to further narrow search queries for apps, such as searching based upon memory usage, bandwidth usage, what files the app attempts to access during use and the like. At step 310, the method 300 ends.

It should be noted that although not explicitly specified, one or more steps of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, operations, steps or blocks in FIG. 3 that recite a determining operation, or involve a decision, do not necessarily require that both branches of the determining operation be practiced. In other words, one of the branches of the determining operation can be deemed as an optional step. Furthermore, operations, steps or blocks of the above described methods can be combined, separated, and/or performed in a different order from that described above, without departing from the example embodiments of the present disclosure.

FIG. 5 depicts a high-level block diagram of a general-purpose computer suitable for use in performing the functions described herein. As depicted in FIG. 5, the system 500 comprises a hardware processor element 502 (e.g., a CPU), a memory 504, e.g., random access memory (RAM) and/or read only memory (ROM), a module 505 for deriving trustful metadata for an app, and various input/output devices 506, e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed method. In one embodiment, the present module or process 505 for deriving trustful metadata for an app can be implemented as computer-executable instructions (e.g., a software program comprising computer-executable instructions) loaded into memory 504 and executed by hardware processor 502 to implement the functions as discussed above. As such, the present method 505 for deriving trustful metadata for an app as discussed above in method 300 (including associated data structures) of the present disclosure can be stored on a non-transitory (e.g., tangible or physical) computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for deriving trustful metadata for a software application for a mobile device, the method comprising:
   crawling, via a processor, online for the software application for the mobile device, wherein a pre-existed meta-data is associated with the software application;
   analyzing, via the processor, the software application to determine a function of the software application, wherein the analyzing comprises analyzing an application behavior and usage from a dynamic analysis to determine the function of the software application for generating the trustful meta-data, wherein the determining the function of the software application comprises determining: a processing capacity used by the software application, a memory capacity used by the software application, and a network protocol used by the software application;
   generating, via the processor, the trustful meta-data as a fingerprint for the software application without relying on the pre-existed meta-data for the software application based upon the function of the software application, wherein the trustful meta-data describes how the software application functions, wherein the trustful meta-data is stored in a metadata file for the software application along with the pre-existed meta-data without overwriting the pre-existed meta-data, wherein the trustful meta-data includes: the processing capacity used by the software application, the memory capacity used by the software application, and the network protocol used by the software application;
   receiving, via the processor, a user query and a filter criterion provided by a user;
   generating, via the processor, a search result in response to the user query, wherein the generating the search result is performed by applying the filter criterion on the trustful meta-data associated with the software application; and
   presenting, via the processor, the search result to the user in accordance with the filter criterion that is predefined by the user.

2. The method of claim 1, wherein the analyzing is performed by a developer.

3. The method of claim 2, wherein the analyzing further comprises analyzing an application programming interface usage from a manifest file to generate the trustful meta-data.

4. The method of claim 1, wherein the analyzing is performed by an operator preview.

5. The method of claim 4, wherein the analyzing further comprises analyzing information obtained from a static binary analysis to generate the trustful meta-data.

6. The method of claim 1, wherein the analyzing is performed by a user preview.

7. The method of claim 1, further comprising:
   presenting a recommended application based upon the filter criterion that is predefined by the user.

8. A non-transitory computer-readable medium storing a plurality of instructions which, when executed by a processor, cause the processor to perform operations for deriving trustful metadata for a software application for a mobile device, the operations comprising:
   crawling online for the software application for the mobile device, wherein a pre-existed meta-data is associated with the software application;
   analyzing the software application to determine a function of the software application, wherein the analyzing comprises analyzing an application behavior and usage from a dynamic analysis to determine the function of the software application for generating the trustful meta-data, wherein the determining the function of the software application comprises determining: a processing capacity used by the software application, a memory capacity used by the software application, and a network protocol used by the software application;
   generating the trustful meta-data as a fingerprint for the software application without relying on the pre-existed meta-data for the software application based upon the function of the software application, wherein the trustful meta-data describes how the software application functions, wherein the trustful meta-data is stored in a metadata file for the software application along with the pre-existed meta-data without overwriting the pre-existed meta-data, wherein the trustful meta-data includes: the processing capacity used by the software application, the memory capacity used by the software application, and the network protocol used by the software application;
   receiving a user query and a filter criterion provided by a user;
   generating a search result in response to the user query, wherein the generating the search result is performed by applying the filter criterion on the trustful meta-data associated with the software application; and
   presenting the search result to the user in accordance with the filter criterion that is predefined by the user.

9. The non-transitory computer-readable medium of claim 8, wherein the analyzing is performed by a developer.

10. The non-transitory computer-readable medium of claim 9, wherein the analyzing further comprises analyzing an application programming interface usage from a manifest file to generate the trustful meta-data.

11. The non-transitory computer-readable medium of claim 8, wherein the analyzing is performed by an operator preview.

12. The non-transitory computer-readable medium of claim 11, wherein the analyzing further comprises analyzing information obtained from a static binary analysis to generate the trustful meta-data.

13. The non-transitory computer-readable medium of claim 8, wherein the analyzing is performed by a user preview.

14. The non-transitory computer-readable medium of claim 8, the operations further comprising:
   presenting a recommended application based upon the filter criterion that is predefined by the user.

15. An apparatus for deriving trustful metadata for a software application for a mobile device, the apparatus comprising:
  a processor; and
  a computer-readable medium storing a plurality of instructions which, when executed by the processor, cause the processor to perform operations, the operations comprising:
    crawling online for the software application for the mobile device, wherein a pre-existed meta-data is associated with the software application;
    analyzing the software application to determine a function of the software application, wherein the analyzing comprises analyzing an application behavior and usage from a dynamic analysis to determine the function of the software application for generating the trustful meta-data, wherein the determining the function of the software application comprises determining: a processing capacity used by the software application, a memory capacity used by the software application, and a network protocol used by the software application;
    generating the trustful meta-data as a fingerprint for the software application without relying on the pre-existed meta-data for the software application based upon the function of the software application, wherein the trustful meta-data describes how the software application functions, wherein the trustful meta-data is stored in a metadata file for the software application along with the pre-existed meta-data without overwriting the pre-existed meta-data, wherein the trustful meta-data includes: the processing capacity used by the software application, the memory capacity used by the software application, and the network protocol used by the software application;
    receiving a user query and a filter criterion provided by a user;
    generating a search result in response to the user query, wherein the generating the search result is performed by applying the filter criterion on the trustful meta-data associated with the software application; and
    presenting the search result to the user in accordance with the filter criterion that is predefined by the user.

16. The apparatus of claim 15, wherein the analyzing further comprises analyzing an application programming interface usage from a manifest file to generate the trustful meta-data.

17. The apparatus of claim 15, wherein the analyzing is performed by an operator preview.

18. The apparatus of claim 17, wherein the analyzing further comprises analyzing information obtained from a static binary analysis to generate the trustful meta-data.

19. The apparatus of claim 15, the operations further comprising:
  presenting a recommended application based upon the filter criterion that is predefined by the user.

20. The apparatus of claim 15, wherein the analyzing is performed by a user preview.

* * * * *